(12) United States Patent
Rosenbaum et al.

(10) Patent No.: US 6,514,588 B2
(45) Date of Patent: Feb. 4, 2003

(54) DUPLEX CD LABEL LAMINATE

(75) Inventors: John C. Rosenbaum, Springboro, OH (US); Joseph D. Roth, Springboro, OH (US)

(73) Assignee: NCR Corporation, Dayton, OH (US)

( * ) Notice: Subject to any disclaimer, the term of this patent is extended or adjusted under 35 U.S.C. 154(b) by 21 days.

(21) Appl. No.: 09/891,923

(22) Filed: Jun. 26, 2001

(65) Prior Publication Data
US 2002/0197434 A1 Dec. 26, 2002

(51) Int. Cl.[7] ................................................ G09F 3/00
(52) U.S. Cl. ...................... 428/40.1; 40/340; 40/638; 206/232; 206/308.1; 206/308.3; 283/81; 428/42.1; 428/42.2; 428/42.3; 428/43; 428/64.1; 428/66.5; 428/192

(58) Field of Search ................................ 428/40.1, 42.1, 428/52.2, 52.3, 53, 64.1, 66.5, 192; 283/81; 203/232, 308.1, 308.3; 40/340, 638

Primary Examiner—Nasser Ahmad
(74) Attorney, Agent, or Firm—Francis L. Conte

(57) ABSTRACT

A label laminate includes a small sheet laminated to a large sheet in a two-ply lamination, with a portion of the large sheet remaining single ply. The lamination has an exposed front side and an exposed back side. The front side includes an annular disk label in the two-ply lamination, and a rectangular first case insert in the single-ply portion. The back side includes a rectangular second case insert in the two-ply lamination behind the disk label.

22 Claims, 4 Drawing Sheets

DUPLEX CD LABEL LAMINATE

BACKGROUND OF THE INVENTION

The present invention relates generally to stationery products, and, more specifically, to label sheets.

Pressure sensitive label sheets are custom designed for various applications. A typical label sheet is a two-ply laminate of a paper facesheet adhesively bonded to an underlying release liner. The release liner is typically supercalendered kraft (SCK) paper which is about half the thickness of the facesheet.

The back of the facesheet includes pressure sensitive adhesive, and the front of the liner includes a silicone release coating which limits the effective bond of the adhesive thereto.

The facesheet is typically severed by diecuts into individual labels of desired configuration such as rectangular. The individual labels may therefore be easily removed from the liner by simply peeling each label along the surrounding diecut perimeter thereof.

Optical disks are commonly available today for storing large amounts of computer data, musical selections, or video images. One optical disk is about 12 cm in diameter in the common form of a compact disk (CD) or digital video disk (DVD). These disks are typically stored in transparent plastic jewel cases specifically configured therefor.

A typical jewel case includes a back tray in which is mounted a clear plastic disk well for mounting the optical disk therein. The case also includes a front tray or cover hinged to the back tray for closing the disk inside.

Commercially available CDs and DVDs are marketed with elaborate graphical images. The optical disk itself has one side on which the data is optically stored, and an opposite side typically having a written and graphical label representation to identify the data stored in the disk. The disk label may be directly printed onto the surface of the disk, or may be printed on a pressure sensitive adhesive label which may be adhesively bonded to the disk.

The jewel case typically includes a back tray paper insert printed on one or both sides thereof. And, a front tray insert may also be provided and printed on one or both sides thereof.

Optical disks are presently available for personal recording by individual users. The disks are typically purchased blank of both data and labeling, and clear plastic jewel cases without labeled inserts are also available. When the user records any desired data on the disk it is desirable to produce a label for the disk, and one or more of the inserts for the jewel case.

Labels sheets are presently commercially available for printing in a personal computer any desired information on an annular disk label and on the front and back tray inserts. This is typically accomplished by providing a standard size label laminate sheet with diecuts and perforations delineating the annular disk label and cooperating corner guides. Since the typical optical disk has a diameter of about 12 cm, two disk labels may be defined in a single 8 ½ by 11 inch label laminate sheet.

Custom software is also commercially available for printing any desired information and graphics on one or both of the two disk labels on the common sheet. However, if only one of the disk labels is desired, the second label must remain unprinted until the need therefor later arises. And, upon removal of both disk labels from the underlying liner, the liner and remaining portions of the facesheet are discarded as waste.

Since the tray inserts for the jewel case are non-adhesive, they must separately be produced from single sheets of standard bond paper. Both back and front tray inserts may be delineated on a single sheet of 8 ½ by 11 inch face stock typically using microperforations in one form of a commercially available product. The front tray insert is typically a continuous rectangle whose perimeter is defined by the corresponding perforation lines. And, the back tray insert is also a rectangle, but typically includes a pair of score lines near opposite edges thereof which define two narrow spines that when folded create a generally U-shaped back tray insert sized to fit within the standard jewel case.

The commercially available software is effective for custom printing both the back and front tray inserts, including the two spine labels for providing enhanced labeling of the jewel case to complement the disk label used on the stored optical disk.

Since back tray inserts are commonly used without the front tray insert for permitting direct viewing of the disk label through the clear front tray, the front tray insert and the remaining portions of the bond sheet used for producing the back tray insert are typically discarded as waste. The presently available two sheet form of labels and inserts for optical disks and their storing jewel cases require separate feeding through the common printer, and result in substantial waste. This increases the overall complexity of disk labeling, as well as increases the overall cost thereof.

Accordingly, it is desired to provide an improved label laminate for producing an annular disk label, back tray insert, and front tray insert with increased efficiency and a reduction of wasted material.

BRIEF SUMMARY OF THE INVENTION

A label laminate includes a small sheet laminated to a large sheet in a two-ply lamination, with a portion of the large sheet remaining single ply. The lamination has an exposed front side and an exposed back side. The front side includes an annular disk label in the two-ply lamination, and a rectangular first case insert in the single-ply portion. The back side includes a rectangular second case insert in the two-ply lamination behind the disk label.

BRIEF DESCRIPTION OF THE DRAWINGS

The invention, in accordance with preferred and exemplary embodiments, together with further objects and advantages thereof, is more particularly described in the following detailed description taken in conjunction with the accompanying drawings in which.

DETAILED DESCRIPTION OF THE INVENTION

Figure 1:
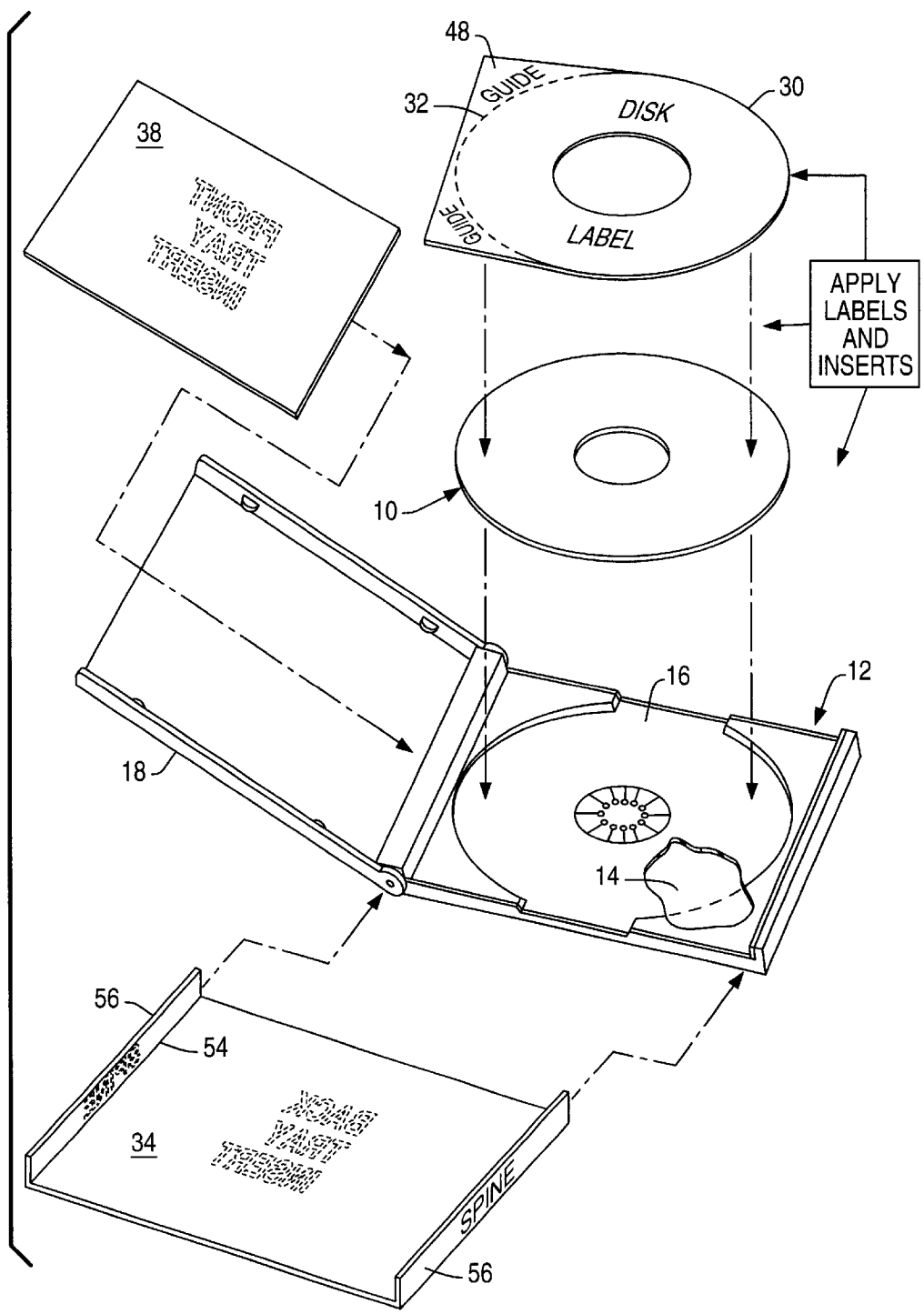
FIG. 1 is an exploded isometric view of the labeling of an optical disk for storage in a jewel case in accordance with an exemplary embodiment of the present invention.

Illustrated in FIG. 1 is a conventional optical disk 10 of about 12 cm in diameter for optically recording data on the bottom surface thereof in a conventional manner. The disk includes a central aperture for being mounted and driven in standard equipment for writing the data thereto or reading the data therefrom.

The optical disk is typically referred to as a compact disk (CD) or a digital video disk (DVD) in which various forms of data may be optically recorded therein for use in computers, audio players, or video players.

The individual disk is typically stored in a clear plastic jewel case 12 specifically configured therefor in a conventional form. The case includes a rectangular bottom or back tray 14 in which is removably mounted a plastic insert in the form of an annular well 16 having a central spindle of flexible fingers which removably capture the disk therein. A front tray or door cover 18 is suitably hinged to one side of the back tray and may be snapped closed for retaining the disk inside the well.

As indicated above, the optical disk 10 may be purchased without data thereon for subsequent recording by the intended user. The user typically desires to label the disk after recording thereof, and may also desire to label the jewel case in which the disk is stored. Since the case is formed of transparent plastic it is typically desirable to provide a paper insert inside the back tray, and optionally a paper insert inside the front tray printed with suitable images thereon of any desired form.

Figure 2:
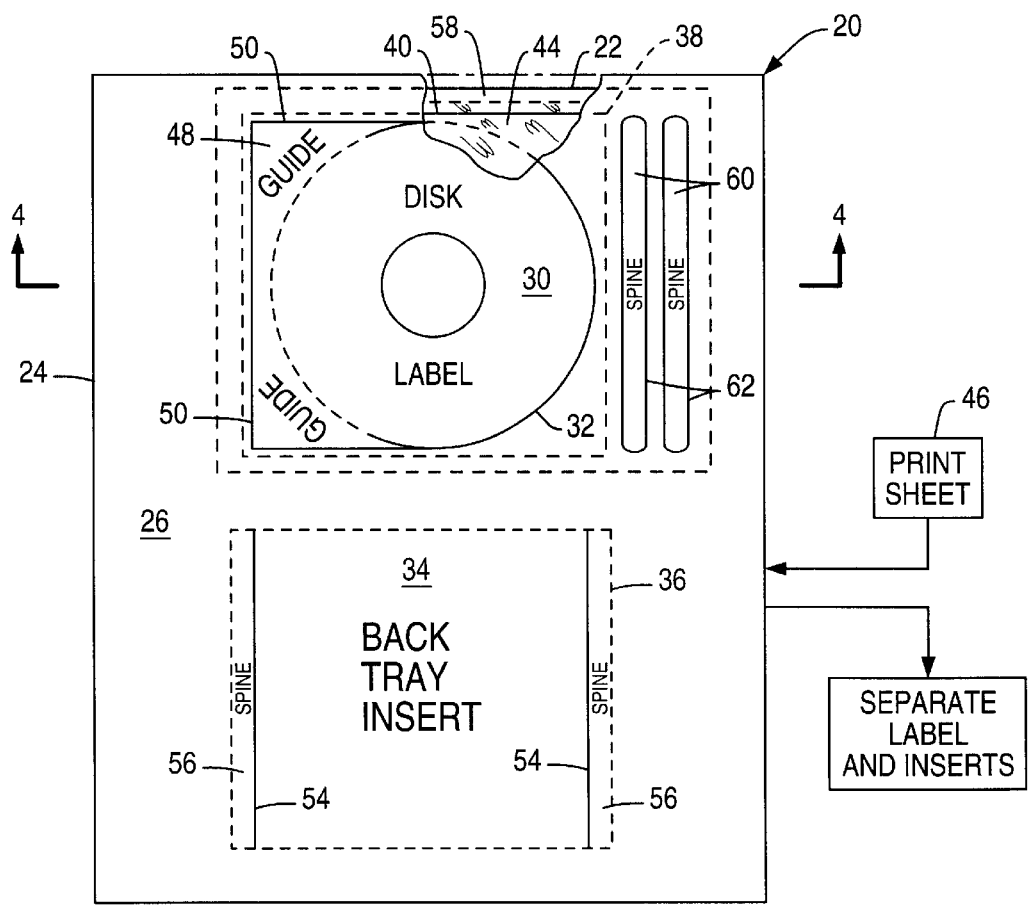
FIG. 2 is a top plan view of the front side of a duplex label laminate in accordance with an exemplary embodiment of the present invention for labeling the optical disk of FIG. 1.
Figure 3:
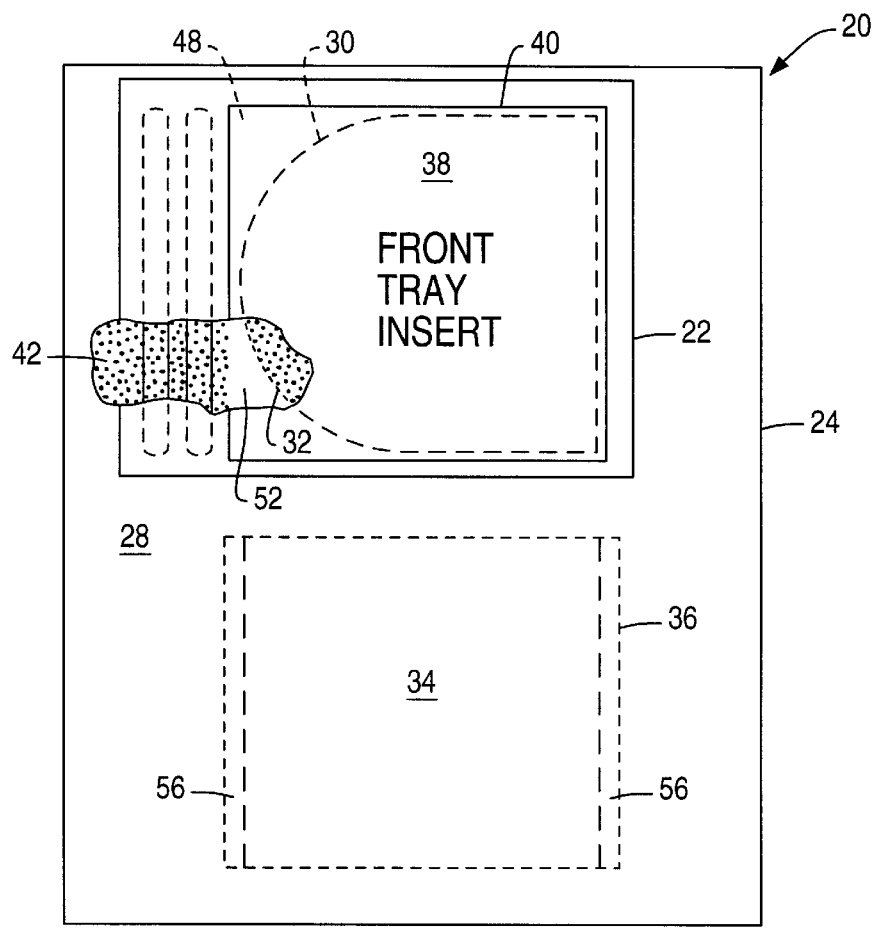
FIG. 3 is a plan view of the back side of the laminate illustrated in FIG. 2.

Illustrated in FIG. 2 is the front side of a duplex label laminate 20 in accordance with one embodiment of the present invention for use in labeling the disk and jewel case illustrated in FIG. 1. FIG. 3 illustrates the back side of the laminate 20, and FIG. 4 illustrates a cross sectional view through the top portion thereof.

Figure 4:
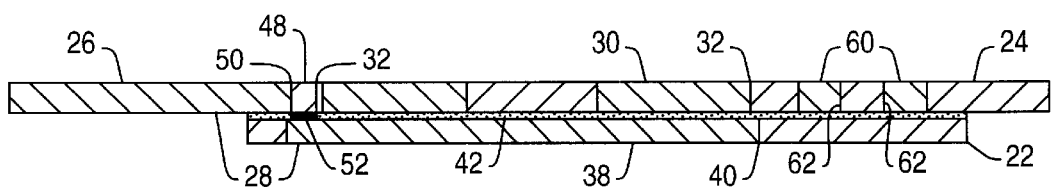
FIG. 4 is a cross sectional view through the laminate illustrated in FIG. 2 and taken along line 4—4.

As shown in FIGS. 2–4, a small sheet 22 of face stock or bond paper is adhesively bonded to a top portion of a large sheet 24 of face stock or bond paper in a two-ply lamination. The large sheet may have a standard rectangular configuration of about 8 ½ by 11 inches, with the small sheet being generally less than half that size with a correspondingly narrower width. The remainder of the large sheet which is not laminated to the small sheet, including its bottom portion, remains single ply.

As shown in FIG. 2, the laminated sheets 22,24 have an exposed front side 26, and as shown in FIG. 3 collectively have an exposed back side 28. As shown in FIG. 2, the front side includes an annular disk label 30 defined or delineated by a separation line 32 in the large sheet of the two-ply lamination in this exemplary embodiment. An annular diecut in the center of the disk label defines a center patch which is discarded as waste.

The front side of the lamination also includes a rectangular first case insert 34 defined or delineated by a corresponding insert separation line 36 in the preferred form of microperforations formed in the single-ply bottom portion of the large sheet.

The back side of the lamination illustrated in FIG. 3 includes a rectangular second case insert 38 defined or delineated by a corresponding separation line 40 in the preferred form of a diecut defining the rectangular perimeter of the second insert in the two-ply lamination behind the disk label.

As shown in FIGS. 3 and 4, the small sheet 22 is bonded to the large sheet 24 with a pressure sensitive adhesive 42 of any conventional composition. The adhesive is disposed on the back side of the large sheet preferably over the entire surface area of the front side of the small sheet including directly behind the disk label 30. And, a silicone release coating 44 as shown in FIG. 2 preferably covers most of the front side of the small sheet for permitting release of the adhesive carried on the back side of the disk label as that label is removed therefrom for subsequent use.

The disk label 30 is removable from the two-ply lamination along its perimeter separation line 32 by simply being peeled away from the underlying release coating in the typical manner of pressure sensitive labels. The removed disk label as illustrated in FIG. 1 is then applied atop the front side of the optical disk 10 and bonded thereto by the included pressure sensitive adhesive carried with the back side of the label.

In a preferred embodiment illustrated in FIG. 2, the single laminate 20 may be fed through a conventional printer 46 for printing thereon any desired images or print in the form of writing or graphical representations as desired. The printer is connected to a conventional computer which may be programmed with suitable software for improving the ease of printing any desired image including elaborate graphics on one or both sides of the laminate. In particular, the printer may be used to print in a single pass therethrough images for labeling both the disk label 30 and the first insert 34.

The printed disk label 30 may then be removed from the lamination and adhesively applied to the disk as illustrated in FIG. 1, and the printed first insert 34 may be removed from the bottom of the large sheet by tearing along the perforated separation line 36, and then inserting the first insert 34 into the corresponding back tray of the jewel case 12 illustrated in FIG. 1.

As shown in FIG. 2 the lamination front side 26 preferably also includes a pair of corner guides 48 in the form of 90 degree tabs integrally extending from one edge of the disk label, with the two guides joining each other parallel to a tangent to the disk label having a relatively thin ligament therebetween. The corner guides are delineated by a corresponding separation line 50 in the form of a diecut through the large sheet of the two-ply lamination.

As shown in FIG. 2 the disk label and its two guides are generally rectangular on the left side and semicircular on the right side with the entire perimeter thereof being defined by the diecut separation lines 32,50. In a preferred embodiment, the separation line 32 where it adjoins a majority of the two guides 48 is preferably in the form of an arcuate perforation line so that the guides may be removed with the disk label in a unitary construction when removed from the lamination.

Although the back side of the disk label 30 as illustrated in FIG. 3 has the pressure sensitive adhesive for subsequent mounting to the optical disk, the two corner guides 48 are preferably non-adhesive, either with no adhesive being initially provided thereon, or with a coating 52 of a conventional desensitizing ink applied over the adhesive to substantially reduce the adhesive effect thereof.

Accordingly, the disk label 30 and both inserts 34,38 may be fed through the printer 44 in either one or two passes therethrough for printing any desired images thereon. The printed disk label and attached guides 48 are then removed from the large sheet and adhesively applied to the optical disk illustrated in FIG. 1 mounted inside the case, and using the guides 48 for providing accurate alignment therein.

The well 16 illustrated in FIG. 1 includes two triangular lands along a common step at the hinge axis of the front tray on which the two guides 48 may be positioned for centering the annular disk label atop the optical disk centered in the well 16. The disk label is simply pressed atop the optical disk to complete the bond thereto. The two guides and intervening ligament may then be torn away from the disk label along the perforated portion of the separation line 32.

In the preferred embodiment illustrated in FIG. 2, the first inset 34 is specifically configured for being mounted in the back tray 14 of the jewel case illustrated in FIG. 1. The first insert therefore includes a pair of fold lines 54 in the preferred form of score lines which are spaced inwardly from opposite left and right edges of the insert for delineating or defining a corresponding pair of internal label spines 56.

As shown in FIG. 3, the second insert 38 is preferably specifically configured for use in the front tray 18 illustrated in FIG. 1 and is therefore continuous within the rectangular perimeter thereof. There are no discontinuities within the perimeter of the second insert such as diecuts, perforations, or score lines.

Since the second insert 38 forms a portion of the small liner sheet 22, it includes the release coating 44 thereon as illustrated in FIG. 2. In this way, the single-ply second insert 38 is non-adhesive on both sides and may be simply trapped behind corresponding tabs formed in the front tray 18.

Correspondingly, the first insert 34 illustrated in FIG. 2 is formed from the bottom portion of the large sheet which is devoid of adhesive on both sides.

Accordingly, the printed first insert 34 may be removed from the bottom of the large sheet by being torn along the perimeter perforation lines 36 and then folded along the two fold lines 54 for angling the corresponding spines 56 to form a generally U-shaped configuration of the first insert. The so-folded first insert may then be conventionally inserted into the back tray 14 illustrated in FIG. 1 by initially removing the well 16 therefrom. When the well insert is reinserted into the back tray, the back tray insert 34 is mechanically trapped therein.

As indicated above, the printed second insert 38 illustrated in FIG. 1 is simply inserted into the top tray 18 in a conventional manner to provide the front tray insert therefor if desired.

In the exemplary embodiment illustrated in FIGS. 2–4, the small sheet 22 is laminated as a liner behind the large sheet 24 which defines the facesheet. The small sheet 22 may be formed of conventional supercalendered kraft (SCK) paper having the silicone release coating on the front side thereof, with the back side thereof being suitably treated for receiving ink or toner during the printing process. Any other suitable liner material may also be used, including machine finish (MF) paper. The two plies defined by the laminated small and large sheets enjoy the same structural integrity as conventional two-ply label laminates.

However, improved integrity may be obtained by providing a border 58 as shown in FIG. 2 around the entire rectangular perimeter of the small sheet, or portions thereof, which is devoid of the silicone release coating 44. In this way, the pressure sensitive adhesive 42 provided between the two sheets can form a permanent bond with the border 58 to prevent liberation thereof from the supporting large sheet.

In the two-ply embodiment of FIGS. 2–4, the disk label 30 is disposed in the top of the large sheet, with the first insert 34 being disposed in the bottom of the large sheet. And, the second insert 38 is disposed in the small sheet directly behind the disk label. In this way, in one pass through the printer, both the disk label 30 and the back tray insert 34 may be suitably printed. And then both components may be applied to the optical disk and jewel case illustrated in FIG. 1. The front tray insert 38 may not be desired by the user for maintaining unobstructed view through the clear front tray 18 to the now-labeled optical disk stored in the well.

The remaining portion of the laminate may be discarded as waste. Or, the front tray insert 38 may be removed therefrom and inserted into the front tray 18 as desired. In this case, the front tray insert 38 should be printed along with the front side of the large sheet in a suitable duplex-printer, or in two passes through a single side printer.

Figure 7:
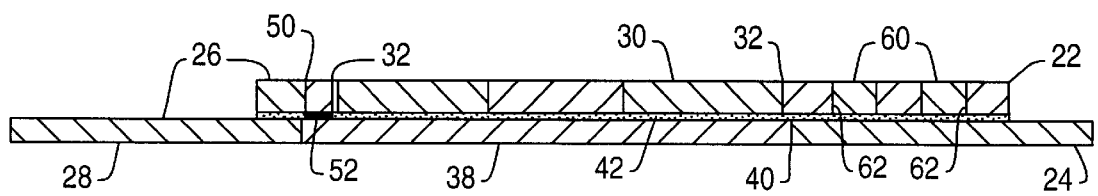
FIG. 7 is a cross sectional view of the laminate illustrated in FIG. 5 and taken along line 7–7.
Figure 5:
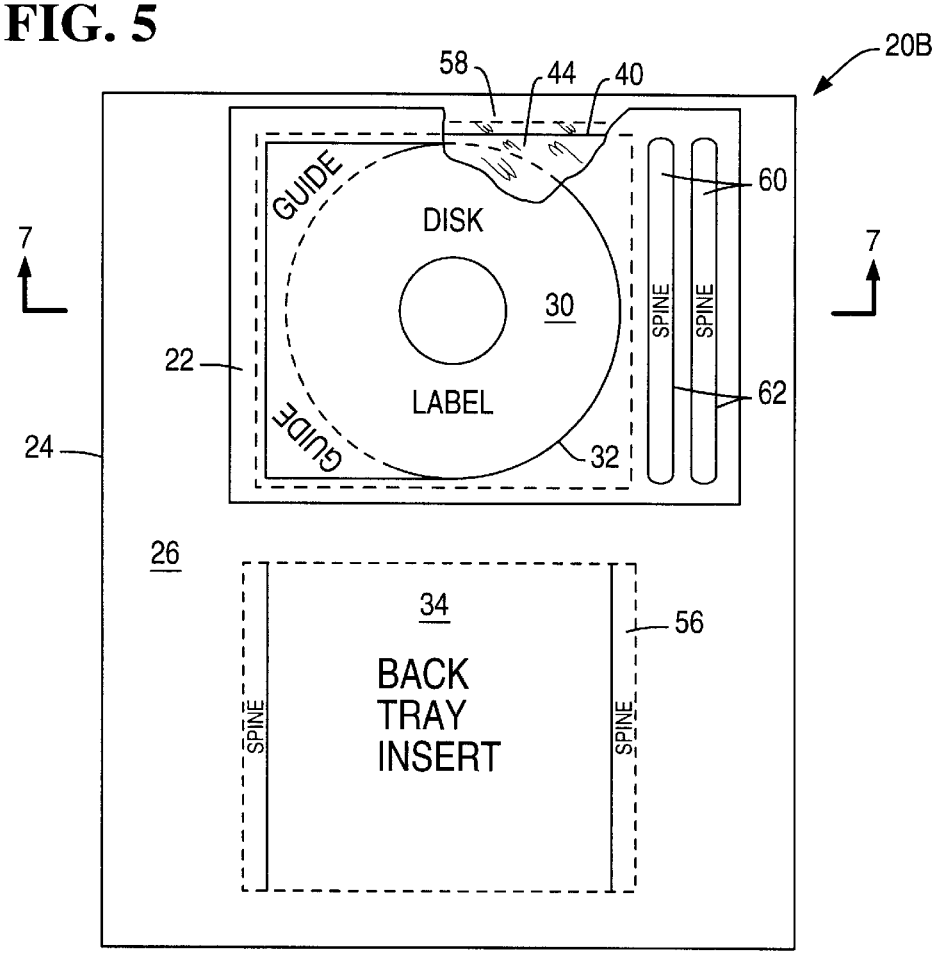
FIG. 5 is a plan view of the front side of a duplex label laminate in accordance with another embodiment of the present invention.
Figure 6:
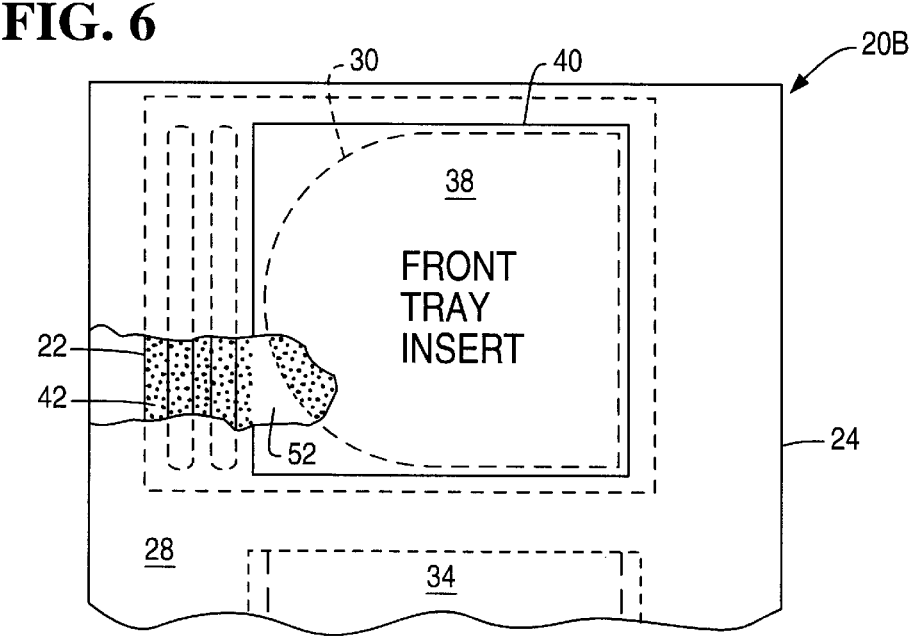
FIG. 6 is a plan view of a top portion of the back side of the laminate illustrated in FIG. 5.

Illustrated in FIGS. 5–7 is an alternate embodiment of the duplex label laminate, designated 20B. This embodiment is substantially identical to the one illustrated in FIGS. 2–4, except that the small sheet 22 is laminated in front of the large sheet 24, on the front side thereof. The disk label 30 is disposed in the small sheet and is delineated therein by the corresponding separation line 32. And, the second insert 38 is disposed in the top of the large sheet 24 and delineated therein by the corresponding separation line 40.

In this embodiment, the top portion of the large sheet 24 includes the silicone release coating 44 on the front side thereof, and the corresponding rectangular patch corresponding with the overlying small sheet 22 is laminated thereatop.

As shown in FIG. 6, the small sheet 22 includes the pressure sensitive adhesive 42 on the back side thereof for removably bonding the disk label 30 to the release coating on the large sheet. As shown in FIG. 5, the border 58 devoid of silicone release coating surrounds the perimeter of that coating within the boundary of the small sheet 22 so that the pressure sensitive adhesive provided on the back side of the small sheet permanently bonds the small sheet around the perimeter thereof to the large sheet around the patch of release coating.

A particular advantage of the second embodiment illustrated in FIG. 5 is that the small sheet 22 may be formed of a different material than that of the large sheet so that specialty material or paper may be used in the limited area of the small sheet in which the disk label 30 is defined. For example, photographic quality ink jet paper or various plastic sheets may be used for the small sheet 22 for providing enhanced resolution and quality of the images printed on the disk label not otherwise available from ordinary bond paper. The disk label 30 may also have a specialty construction including an integrated antenna or a wireless communication chip such as a radio frequency (RF) tag of conventional forms. And, the limited size of the small sheet 22 correspondingly reduces the overall cost of the two-ply lamination when using such specialty materials.

In both embodiments illustrated in FIGS. 2 and 5, the two-ply lamination of sheets 22,24 preferably also includes a pair of external label spines 60 delineated by corresponding separation lines 62 in the preferred form of surrounding diecuts in the front side thereof. The external spines are narrow bands sized to fit the corresponding front and back spine edges of the jewel case illustrated in FIG. 1.

In the FIG. 2 embodiment, the external spines are formed in the large sheet 24 and include the pressure sensitive adhesive on the back sides thereof, and, in the FIG. 5 embodiment, the external spines are formed in the small sheet 22 and include the pressure sensitive adhesive on the back sides thereof.

Accordingly, the external label spines 60 may be peeled from the corresponding release liners of either embodiment and applied along the corresponding front and back edges of the jewel case illustrated in FIG. 1 for providing external labels therefor. And, the external spines may be conveniently printed in the printer 46 illustrated in FIG. 2 in the same pass therethrough when printing the disk label 30 and the back tray insert 34.

The two-ply lamination of sheets 22,24 provide an integrated or common laminate in which the disk label 30, back tray insert 34, and front tray insert 38, along with the external label spines 62 may be formed, printed, and removed for labeling the optical disk and jewel case illustrated in FIG. 1. The efficiency of the labeling process is improved. And, a substantial reduction in wasted material is enjoyed over the previous two-sheet constructions for separately producing disk labels and tray inserts.

While there have been described herein what are considered to be preferred and exemplary embodiments of the present invention, other modifications of the invention shall be apparent to those skilled in the art from the teachings herein, and it is, therefore, desired to be secured in the appended claims all such modifications as fall within the true spirit and scope of the invention.

Accordingly, what is desired to be secured by Letters Patent of the United States is the invention as defined and differentiated in the following claims in which we claim:

What is claimed is:

1. A label laminate for a case mounted optical disk comprising:
   a small sheet bonded to a top portion of a large sheet in a two-ply lamination, with a bottom portion of said large sheet remaining single ply;
   said laminated sheets having an exposed front side and an opposite exposed back side;
   said front side including an annular disk label delineated by a separation line in said two-ply lamination, and a rectangular first case insert delineated by a separation line in said single-ply bottom portion; and
   said back side including a rectangular second case insert delineated by a separation line in said two-ply lamination behind said disk label.

2. A laminate according to claim 1 wherein:
   said small sheet is bonded to said large sheet with a pressure sensitive adhesive on one of said sheets behind said disk label, and a release coating is disposed on the other sheet; and
   said disk label is removable from said lamination along said separation line therearound for being bonded to said disk using said pressure sensitive adhesive.

3. A method of using said laminate according to claim 2 comprising:
   printing images atop both said disk label and first insert;
   removing said printed disk label from said lamination and adhesively applying said disk label to said disk; and
   removing said printed first insert from the bottom of said large sheet, and inserting said first insert into said case.

4. A laminate according to claim 2 wherein said lamination front side further includes a pair of corner guides adjoining said disk label, and delineated by a separation line in said two-ply lamination.

5. A laminate according to claim 4 wherein said corner guides are non-adhesive.

6. A laminate according to claim 4 wherein said first insert includes a pair of fold lines spaced inwardly from opposite edges thereof for delineating a corresponding pair of spines.

7. A laminate according to claim 6 wherein said second insert is continuous within the perimeter thereof, and includes said release coating thereon.

8. A method of using said laminate according to claim 7 comprising;
   printing images atop said disk label and both inserts;
   removing said printed disk label from said lamination and adhesively applying said disk label to said disk mounted inside said case using said guides for alignment therein;
   removing said printed first insert from the bottom of said large sheet, and folding said spines along said fold lines therefor;
   inserting said folded first insert into a back tray of said case; and
   removing said printed second insert from said lamination, and inserting said second insert into a top tray of said case.

9. A laminate according to claim 4 wherein:
   said small sheet is laminated behind said large sheet;
   said disk label is disposed in the top of said large sheet; and
   said second insert is disposed in said small sheet.

10. A laminate according to claim 9 wherein:
    said small sheet includes said release coating, and a border devoid of said release coating; and
    said large sheet includes said pressure sensitive adhesive for removably bonding said disk label to said small sheet, and permanently bonding said large sheet to said small sheet border.

11. A laminate according to claim 4 wherein:
    said small sheet is laminated in front of said large sheet;
    said disk label is disposed in said small sheet; and
    said second insert is disposed in the top of said large sheet.

12. A laminate according to claim 11 wherein:
    said top portion of said large sheet includes said release coating; and
    said small sheet includes said pressure sensitive adhesive for removably bonding said disk label to said release coating on said large sheet, and permanently bonding said small sheet to said large sheet around said release coating.

13. A laminate according to claim 4 wherein said two-ply lamination further includes a pair of spines delineated by corresponding separation lines in said front side, and including said pressure sensitive adhesive on back sides thereof.

14. A label laminate for a case mounted optical disk comprising:
    a small sheet bonded behind a top portion of a large sheet in a two-ply lamination, with a bottom portion of said large sheet remaining single ply;
    said large sheet having a front side including an annular disk label delineated by a separation line therein, and a rectangular first case insert delineated by a separation line in said single-ply bottom portion thereof; and
    said small sheet having a back side including a rectangular second case insert delineated by a separation line therein behind said disk label.

15. A laminate according to claim 14 wherein:
    said small sheet includes a front side having a release coating thereon;
    said large sheet includes a back side having a pressure sensitive adhesive behind said disk label thereof; and
    said disk label is removable from said large sheet along said separation line therearound and from said small sheet at said release coating thereon for being bonded to said disk using said pressure sensitive adhesive.

16. A laminate according to claim 15 wherein said first insert includes a pair of fold lines spaced inwardly from opposite edges thereof for delineating a corresponding pair of spines; and said second insert is continuous within the perimeter thereof, and includes said release coating thereon.

17. A laminate according to claim 16 wherein said large sheet further includes a pair of corner guides adjoining said disk label and delineated by a separation line therein.

18. A label laminate for a case mounted optical disk comprising:

a small sheet bonded in front of a top portion of a large sheet in a two-ply lamination, with a bottom portion of said large sheet remaining single ply;

said small sheet having a front side including an annular disk label delineated by a separation line therein; and said large sheet including a rectangular first case insert delineated by a separation line in said single-ply bottom portion thereof, and a rectangular second case insert delineated by a separation line in said top portion thereof behind said disk label.

19. A laminate according to claim 18 wherein:

said top portion of said large sheet includes said release coating; and said small sheet includes said pressure sensitive adhesive for removably bonding said disk label to said release coating on said large sheet, and permanently bonding said small sheet to said large sheet around said release coating.

20. A laminate according to claim 19 wherein said first insert includes a pair of fold lines spaced inwardly from opposite edges thereof for delineating a corresponding pair of spines; and said second insert is continuous within the perimeter thereof, and includes said release coating thereon.

21. A laminate according to claim 20 wherein said small sheet further includes a pair of corner guides adjoining said disk label, and delineated by a separation line therein.

22. A laminate according to claim 21 wherein said small and large sheets are different materials.

* * * * *